United States Patent Office 3,520,487
Patented July 14, 1970

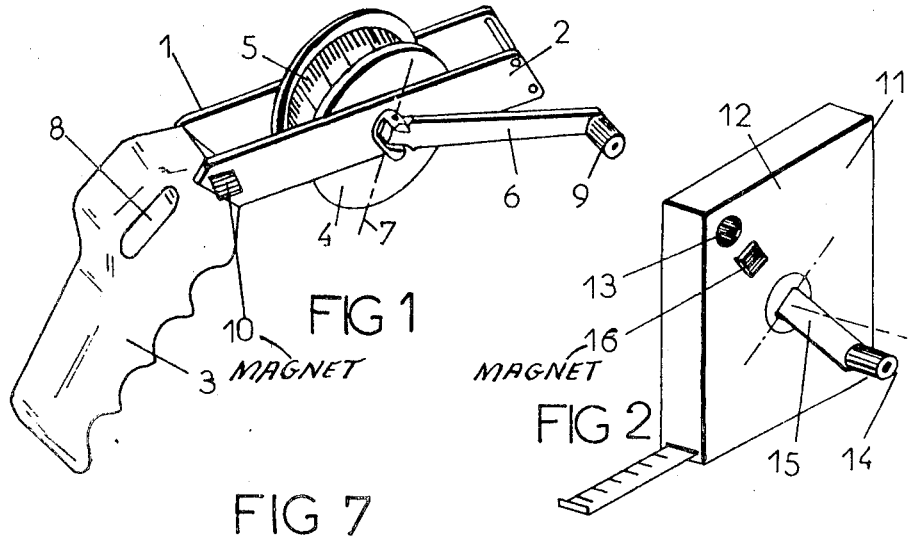
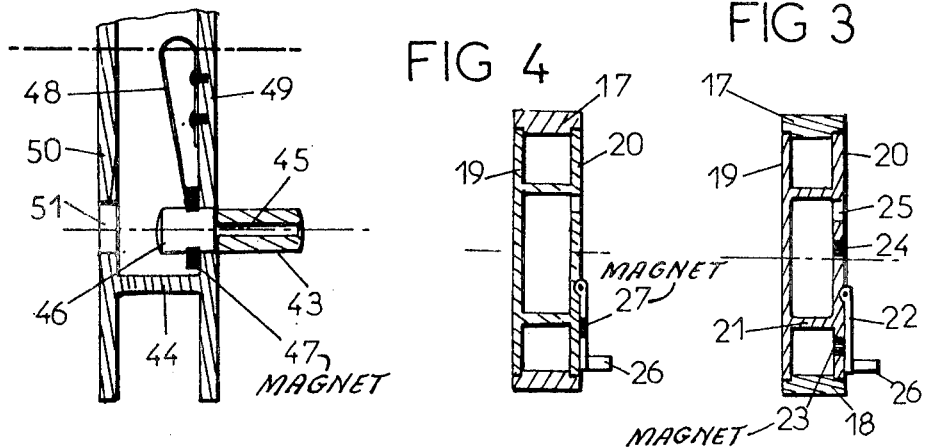
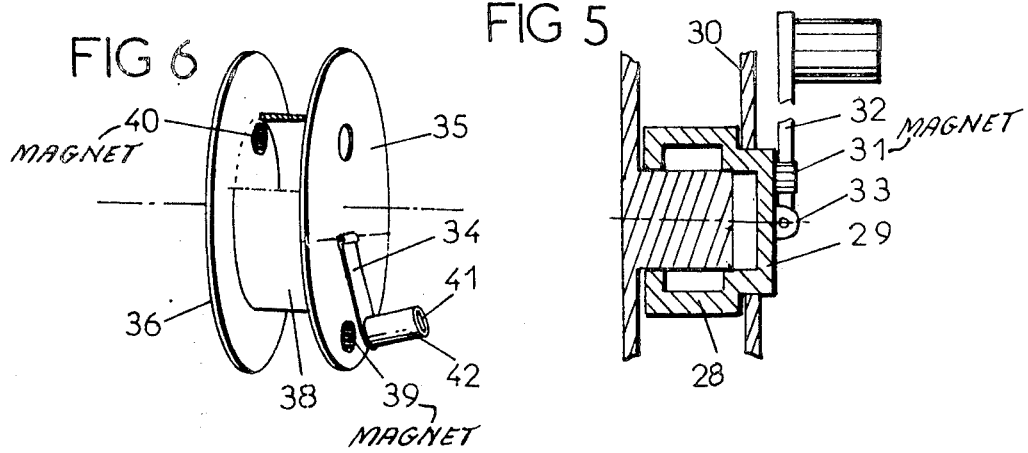

3,520,487
MAGNETICALLY-RETAINED CRANK ELEMENT
FOR LINEAR MEASURING INSTRUMENTS
André Quenot, Besancon, Doubs, France, assignor to
Quenot & Cie S.a.r.l., Besancon, Doubs, France, a
company of France
Filed May 9, 1968, Ser. No. 727,833
Claims priority, application France, Nov. 10, 1967,
127,653
Int. Cl. B65h 75/16
U.S. Cl. 242—84.8                                8 Claims

ABSTRACT OF THE DISCLOSURE

A linear measuring instrument of the type having a crank arm for rotationally driving a winding drum is provided with various types of magnetic holding means to maintain the crank arm in either a winding or nonwinding position.

---

Linear measuring instruments having manually rewound tapes and having a foldable or retractable crank arm, for example a handle, for rotationally driving the winding drum to wind the tape are well known in the art.

The crank handle must be retained in both a nonwinding folded position as well as in a winding position. This result is obtained either by clamping or by the action of a spring which maintains the crank arm in one or the other position.

These prior art techniques have the disadvantages inherent to all mechanical systems and are prone to defects and breakdowns. Additionally, their assembly is costly and delicate.

Consequently, the present invention proposes to provide an improvement in linear measuring instruments of the type having a manually wound tape which permits retention of the crank arm in its different positions while being easy to assemble and inexpensive.

To this effect, the invention is concerned with an improvement in linear measuring instruments having manually rewound tapes characterized in that either the crank arm or the casing or a side flange is provided with one magnetic fastening device.

The invention will be better understood by referring to the following description made by way of nonlimiting example and to the accompanying drawing in which:

FIG. 1 shows a linear measuring instrument having a frame and a handle provided with a magnetic wafer cooperating with a recess in the handle.

FIG. 2 shows in perspective a linear measuring instrument having a casing provided with a wafer cooperating with an opening in the casing.

FIG. 3 shows cross sectionally an instrument with movable flanges equipped with two magnetic wafers.

FIG. 4 shows cross sectionally an instrument with movable flanges and a handle provided with a magnet.

FIG. 5 shows in cross section a flangeless instrument provided with a magnet.

FIG. 6 shows a modification of an instrument with movable flanges provided with magnetized wafers.

FIG. 7 shows a modification with a pusher handle magnetically secured.

Reference is made to FIG. 1

The linear measuring instrument 1 comprises a frame 2 provided with a handle 3. In frame 2 is rotatably mounted a winding drum 4 on which a tape 5 is wound. The drum 4 is rotationally driven by a crank arm 6 which is foldable about a shaft 7.

An opening 8 is provided in handle 3 to receive a crank handle 9 of the crank arm 6 when the same is folded into its nonwinding position. In this position, the crank arm 6 can no longer rotationally drive the drum 4. In order to prevent unwanted rotation of crank arm 6 around shaft 7 a magnetic holding means comprising a magnetic wafer 10 is secured on either the frame 2 or handle 3 in order to retain the crank arm 6 in its nonwinding position.

Crank arm 6 is made of ferromagnetic material either entirely or in the region which abuts against the magnetic wafer 10. In a modification, it is possible to position wafer 10 on crank arm 6 and construct the frame 2 at least partially of ferromagnetic material.

Reference is made to FIG. 2

The measuring instrument 11 comprises a casing 12 provided with an opening 13 which houses a crank handle 14 of crank arm 15 when the same is in folded, nonwinding position. A magnetized wafer 16 is secured in or on casing 12 and functions to retain crank handle 14 within the opening 13.

Naturally, a mechanical device, a clamp or other device, can be provided on all the embodiments to maintain the handle in its winding position.

Reference is made to FIG. 3

The measuring instrument 17 comprises a casing 18 in which is rotatably mounted a winding drum 21 having side flanges 19 and 20. A ferromagnetic crank arm 22 is movable about a shaft carried by flange 20. Two magnetized wafers 23 and 24 are mounted on the flange 20 to retain the crank arm in its winding and nonwinding positions, respectively. An opening 25 is provided in the flange 20 to receive the crank handle 26 when the crank arm is moved into its nonwinding position.

Reference is made to FIG. 4

In a modification, the crank arm 22 has another magnet 27 connected thereon and arranged to expose a magnetic pole on each of its two sides. This magnet 27 magnetically holds the crank arm 22 in either the winding or nonwinding position. Said magnet 27 can be replaced by two magnetic wafers (not shown) located each on a different side of the crank arm.

The last-mentioned embodiment is also applicable to instruments having only a single movable flange carrying the crank arm.

Reference is made to FIG. 5

It is also possible to magnetically hold the crank arm of a measuring instrument of a type having no outside movable flanges. In this type embodiment a rotatably mounted winding drum 28 is provided with a ferromagnetic part 29 emerging through a wall 30 of the casing and cooperates with a magnet 31 located on crank arm 32. The magnet 31 must be located very near shaft 33 of crank arm 32.

Reference is made to FIG. 6

By way of a modification and in the case where the crank arm 34 is not made of ferromagnetic material, side flanges 35 and 36 of winding drum 38 can be equipped with magnetic plates 39 and 40 cooperating, for example, with a ferromagnetic shaft 41 on which the crank handle 42 is rotatably mounted.

Reference is made to FIG. 7

In another modification, the handle of the measuring instrument is replaced by a pusher type handle 43 which slides inside a winding drum 44. This arrangement can advantageously be used for drums of large diameters. The pusher type handle is movable about a shaft 45 secured to a body 46 which carries a toric-shaped magnet 47. A spring blade 48 continuously biases the body 46 against a side flange 49. In its working position, handle 43 projects from ferromagnetic flange 49 against which it is maintained due to magnet 47. When handle 43 is manually pushed back inside the drum 44, spring 48 is tensed and the magnet 47 is attracted to the opposite flange 50 to which it adheres. An opening 51 allows body 46 to protrude outside flange 50. To replace handle 43 into its working position, it suffices to bear against the body 46 with sufficient force to overcome the attraction of magnet 47 whereby spring 48 urges the handle 43 back to the position shown in FIG. 2.

1. An improved linear measuring instrument comprising: a rotatably mounted winding drum; a linear measuring tape removably wound on said winding drum; mounting means for rotatably mounting said winding drum; a crank arm connected to said winding drum, said crank arm having a winding position operable to effect rotation of said winding drum and a nonwinding position; and magnetic holding means for magnetically holding said crank arm in at least one of the two above-mentioned positions.

2. An instrument according to claim 1; wherein said crank arm is pivotally connected to said winding drum and includes a handle at its distal end.

3. An instrument according to claim 2; wherein said winding drum includes two side flanges, one of said flanges having an opening therein sized to receive therein said handle when said crank arm is in said nonwinding position.

4. An instrument according to claim 3; wherein said magnetic holding means comprises a ferromagnetic material constituting at least a portion of said crank arm, and a magnet positioned on the flange having said opening therein adjacent said opening, whereby said crank arm is magnetically held in its nonwinding position when said handle is inserted into said opening.

5. An instrument according to claim 4; wherein said magnetic holding means further includes another magnet mounted on said side flange, whereby said crank arm can be magnetically held in its winding position.

6. An instrument according to claim 3; wherein said magnetic holding means comprises a magnet constituting a portion of said crank arm, and the side flange having said opening therein having a portion comprised of ferromagnetic material, whereby said crank arm is magnetically held in its nonwinding position when said handle is inserted into said opening and is otherwise magnetically held in its winding position.

7. An instrument according to claim 3; wherein said magnetic holding means comprises a ferromagnetic material extending through said handle, a first magnet mounted on the other side of said flanges in face-to-face relationship with said opening, and a second magnet mounted on said one flange.

8. An instrument according to claim 1; wherein said winding drum includes two, ferromagnetic side flanges; wherein said crank arm is slidably mounted with respect to said winding drum; a magnet mounted on one end of said crank arm within said winding drum; and a spring disposed within said winding drum normally urging said magnet against one of said two, ferromagnetic side flanges.

References Cited

UNITED STATES PATENTS

| | | | |
|---|---|---|---|
| 1,340,712 | 5/1920 | Hare | 242—84.8 |
| 2,684,815 | 7/1954 | Holz | 242—74 |

NATHAN L. MINTZ, Primary Examiner